(12) United States Patent
Balakrishnan et al.

(10) Patent No.: US 10,715,376 B2
(45) Date of Patent: Jul. 14, 2020

(54) ENHANCED IQ MISMATCH CORRECTION FUNCTION GENERATOR

(71) Applicant: TEXAS INSTRUMENTS INCORPORATED, Dallas, TX (US)

(72) Inventors: Jaiganesh Balakrishnan, Bengaluru (IN); Jawaharlal Tangudu, Bengaluru (IN); Sthanunathan Ramakrishnan, Bengaluru (IN); Chandrasekhar Sriram, Chennai (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/444,035

(22) Filed: Jun. 18, 2019

(65) Prior Publication Data

US 2020/0145277 A1 May 7, 2020

Related U.S. Application Data

(60) Provisional application No. 62/786,727, filed on Dec. 31, 2018.

(30) Foreign Application Priority Data

Nov. 2, 2018 (IN) .............................. 201841041535

(51) Int. Cl.
| | | |
|---|---|---|
| *H03D 1/04* | (2006.01) | |
| *H04L 27/38* | (2006.01) | |
| *H04B 1/30* | (2006.01) | |
| *H04L 27/26* | (2006.01) | |
| *H04L 27/36* | (2006.01) | |

(52) U.S. Cl.
CPC .......... *H04L 27/3863* (2013.01); *H04B 1/30* (2013.01); *H04L 27/2628* (2013.01); *H04L 27/364* (2013.01)

(58) Field of Classification Search
CPC ............. H04L 27/3863; H04L 27/2628; H04L 27/364
USPC ........................................................ 375/346
See application file for complete search history.

(56) References Cited

U.S. PATENT DOCUMENTS

| | | | |
|---|---|---|---|
| 9,154,338 B1* | 10/2015 | Tsatsanis | H04L 43/12 |
| 9,431,962 B2* | 8/2016 | Rutten | H04B 1/16 |
| 2008/0159442 A1* | 7/2008 | Tanabe | H04L 27/3863 |
| | | | 375/324 |
| 2009/0323861 A1* | 12/2009 | Safavi | H04L 27/2647 |
| | | | 375/302 |

(Continued)

*Primary Examiner* — Helene E Tayong
(74) *Attorney, Agent, or Firm* — John. R. Pessetto; Charles A. Brill; Frank D. Cimino

(57) ABSTRACT

An IQ mismatch correction function generator configured to generate an enhanced IQ mismatch correction function to improve the compensation for IQ mismatch, and an IQ signal receiver with the IQ mismatch correction function generator, wherein the enhanced IQ mismatch correction function is determined based on an initial IQ mismatch correction function derived from IQ mismatch estimates corresponding to frequency bins where signals are present and error of the initial IQ mismatch correction function by comparing the values of the initial IQ mismatch correction function with IQ mismatch estimates corresponding to a respective bin of the frequency bins.

17 Claims, 6 Drawing Sheets

(56) References Cited

U.S. PATENT DOCUMENTS

| | | | |
|---|---|---|---|
| 2009/0325516 A1* | 12/2009 | Safavi | H04L 27/364 455/126 |
| 2010/0099363 A1* | 4/2010 | Faust | H04B 17/10 455/69 |
| 2011/0268232 A1* | 11/2011 | Park | H04B 1/30 375/344 |
| 2014/0029700 A1* | 1/2014 | Viswanathan | H03D 3/009 375/324 |
| 2014/0270002 A1* | 9/2014 | Schubert | H04L 1/0045 375/320 |

* cited by examiner

ENHANCED IQ MISMATCH CORRECTION FUNCTION GENERATOR

RELATED APPLICATIONS

This application claims priority to Indian Provisional Application No. 201841041535, filed Nov. 2, 2018, and U.S. Provisional Application No. 62/786,727, filed Dec. 31, 2018, which are hereby incorporated by reference.

BACKGROUND

In a quadrature signal system, baseband signal may comprise two-real signals: in-phase (I) and quadrature-phase (Q) signals. These I and Q baseband signals are multiplied with cosine and sine waves of a RF transmitter and combined to generate a RF passband signal (IQ RF signals). Ideally, the cosine and sine waves of the RF transmitter have the same amplitude and differ in phase by 90 degrees, thereby making the IQ RF signals a pair of quadrature signals. Zero-IF receiver employs homodyne or direct down conversion method to receive this pair of quadrature signals. During the direct down conversion, the passband signal is mixed with the in-phase and quadrature-phase components of a local oscillator signal to generate IQ baseband signals for further baseband processing.

While receiving the IQ RF signals, it is important to maintain the amplitude and phase relationship between the I and Q signals to ensure an accurate signal reception. It is also important to maintain the same gain and the 90 degree phase relationship between the in-phase and quadrature-phase components of the local oscillator to prevent a gain or phase skew between the I and Q signals. In reality, however, errors such as an IQ gain/phase imbalance existing in a zero-IF receiver impairs the amplitude and phase relationship between the IQ RF signals. Such IQ gain/phase imbalances are due to mismatches in the gain and phase between the components of the local oscillator, and the mismatches in the analog filters and analog-digital converters (ADC) between the I and Q paths.

A correction is attempted to compensate for impairments caused by IQ mismatch by estimating the IQ mismatch. The zero-IF receiver may, in turn, compensate for skews on the pair of quadrature signals by correcting the quadrature signals based on the IQ mismatch estimates.

SUMMARY

An aspect of the present invention provides an IQ mismatch correction function generator configured to generate an enhanced IQ mismatch correction function to improve the compensation for IQ mismatch, and an IQ signal receiver with the IQ mismatch correction function generator.

Yet another aspect of the present invention to improve the compensation of IQ mismatch provides an initial IQ mismatch correction function generator configured to generate an initial IQ mismatch correction function based on IQ estimates at least one frequency bin, an error mitigation logic configured to determine an error of the initial mismatch correction function, and enhanced IQ mismatch correction function generator configured to generate an enhanced IQ mismatch correction function based on the initial IQ mismatch correction function and the error determined by the error mitigation logic to enhance the accuracy of IQ mismatch estimates.

Yet another aspect of the present invention to improve the compensation for IQ mismatch provides an IQ mismatch correction function generator configured to generate an initial IQ mismatch correction function and an enhanced IQ mismatch correction function, and a feedback loop configured to determine a difference between the values of the initial IQ mismatch correction function corresponding to at least one frequency bin and IQ mismatch estimates corresponding to a respective bin of the at least one frequency bin, and output the difference as error of the initial IQ mismatch correction function to the IQ mismatch correction function generator to generate the enhanced IQ mismatch correction function.

BRIEF DESCRIPTION OF THE DRAWINGS

For a detailed description of various examples, reference will now be made to the accompanying drawings in which.

DETAILED DESCRIPTION

In the following detailed description, reference is made to certain examples of the present invention. These examples are described with sufficient detail to enable those skilled in the art to practice them. It is to be understood that other examples may be employed and that various structural, logical, and electrical changes may be made. Moreover, while specific examples are described in connection with a zero-IF receiver, it should be understood that features described herein are generally applicable to zero-IF transmitter and other types of systems like low-IF transmitters, receivers, and transceivers, electronic parts, circuits, or other types of transmitters and receivers with changes well known to those skilled in the art.

In this description, the term "couple" or "couples" means either an indirect or direct wired or wireless connection. Thus, if a first device couples to a second device, that connection may be through a direct connection or through an indirect connection via other devices and connections. For another instance, when a first device is coupled to a second device, the first and second device may be coupled through a capacitor. The recitation "based on" means "based at least in part on." Therefore, if X is based on Y, X may be a function of Y and any number of other factors.

Figure 1:
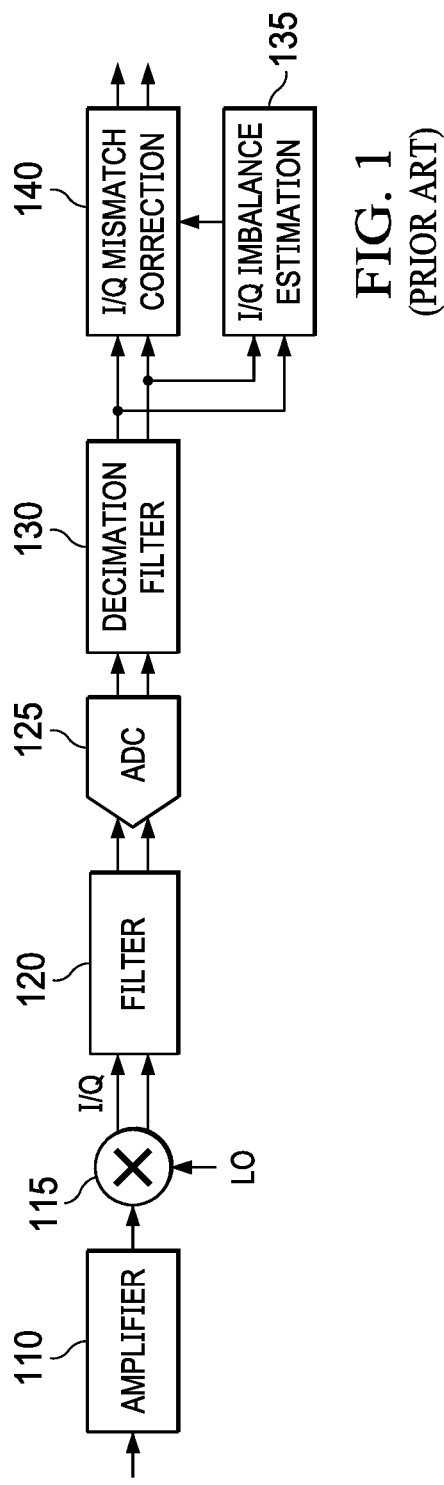
FIG. 1 illustrates a block diagram of a prior art zero-IF receiver.

FIG. 1 illustrates a block diagram of a zero-IF receiver according to an example of prior art. The prior art zero-IF receiver of FIG. 1 comprises amplifier 110 amplifying the received quadrature passband signals, mixer 115 down-converting the amplified quadrature passband signals with in-phase and quadrature-phase components of a local oscillator signal, and filter 120 filtering signals within the frequency range of interest.

The zero-IF receiver of FIG. 1 further comprises analog digital convertor 125 to convert the filtered signal from filter 120 into digital signals, an optional decimation filter 130 reducing the rate of the digital signals, IQ imbalance estimation module 135 estimating the IQ imbalance based on the down-converted digital signals, and IQ mismatch correction module 140 correcting the digital signals output from decimation filter 130 to compensate for IQ imbalance estimated in the digital signals.

Figure 2:
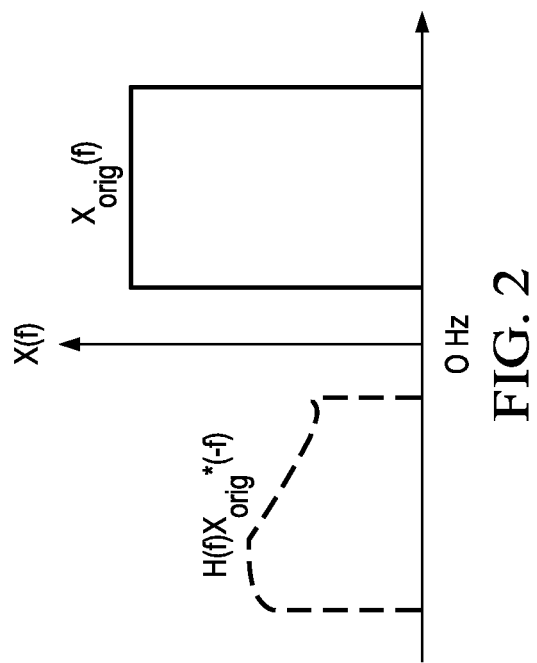
FIG. 2 illustrates a signal spectrum of baseband signal and image signal of the baseband signal due to IQ mismatch.

FIG. 2 illustrates a frequency spectrum of baseband signal and image signal of the baseband signal due to IQ mismatch. In the example of FIG. 2, signals on the right pane of frequency spectrum, positive frequency signals, reflect the original signal $X_{orig}(f)$ transmitted from a zero-IF transmitter. In an ideal zero-IF transmitter and zero-IF receiver without an IQ mismatch, only the original signal $X_{orig}(f)$ should be observed when the zero-IF receiver processes the quadrature passband signals to baseband signals. Because of IQ mismatch, however, the output signal includes an image signal, in the example of FIG. 2, $H(f)X_{orig}*(-f)$ of negative frequency.

In FIG. 2, H(f) is an IQ mismatch function, which may be estimated based on an IQ mismatch estimation algorithm. The IQ mismatch function H(f) may be used by a zero-IF receiver to compensate a signal skew due to IQ mismatch.

Figure 3:
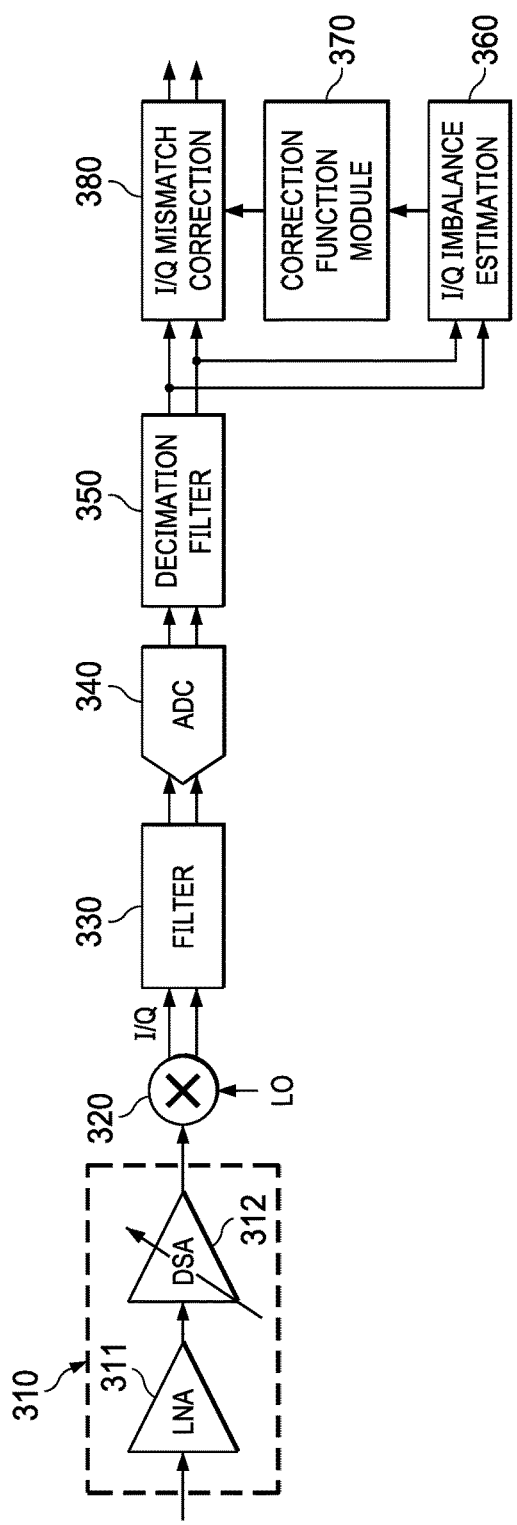
FIG. 3 illustrates a block diagram of a zero-IF receiver according to an aspect of the present invention.

FIG. 3 illustrates a block diagram of a zero-IF receiver according to an aspect of the present invention. The zero-IF receiver of FIG. 3 comprises amplifier 310 configured to amplify the passband quadrature signals received by the zero-IF receiver, mixer 320 configured to mix the in-phase and quadrature-phase components of a local oscillator signal with the amplified passband signals to generate baseband quadrature signals, and filter 330 configured to filter the baseband quadrature signals. In the example of FIG. 3, amplifier 310 includes low noise amplifier 311 configured to amplify the received signal and digital step amplifier 312 configured to be gain adjustable. Filter 330 of FIG. 3 may be a lowpass filter configured to low pass signals under certain frequency while filtering noise and interferers from the mixed quadrature signals.

Quadrature signals output from filter 330 is converted into digital signals by analog digital convertor 340. The digital quadrature signals may further be decimated into an acceptable sampling rate preferable for a system receiving the passband quadrature signals by decimation filter 350.

IQ imbalance estimation module 360 estimates $H_{valid}$, which is IQ imbalance or mismatch corresponding to frequency bins where signals are present, i.e., valid bins. For instance, where 10 MHz and 100 MHz baseband signals were transmitted, IQ imbalance estimation module 360 estimates IQ imbalance corresponding to 10 MHz frequency bin and 100 MHz frequency bin. The terms imbalance and mismatch are used interchangeably in this specification.

Correction function module 370 generates a correction function provided to IQ mismatch correction filter 380 to compensate digital quadrature signals output from decimation filter 350 for IQ mismatch. The correction function(s) generated by correction function module 370 serves as correction filter coefficients of IQ mismatch correction filter 380. According to an aspect of the present invention, correction function module 370 generates an initial IQ mismatch correction function ($h_{corr}$), and based on the errors of the initial correction function, may further generate an enhanced IQ mismatch correction function ($g_{corr}$). Either the initial IQ mismatch correction function or the enhanced IQ mismatch correction function serves as correction filter coefficients of IQ mismatch correction filter 380.

An initial IQ mismatch correction filter coefficients of IQ mismatch correction filter 380, which are values of initial IQ mismatch correction function $h_{corr}$ generated by correction function module 370, is obtained based on the estimates of H(f) at the valid bins, $H_{valid}$. As noted above, $H_{valid}$ is provided by IQ imbalance estimation module 360. Correction function module 370 interpolates $H_{valid}$ across all frequency bins and then inverse fast fourier transforms (IFFT) the interpolated $H_{valid}$, $H_{int}$, to its time domain equivalents, $h_{int}$. The time domain equivalents of the interpolated IQ estimates at the valid bins are, in turn, truncated to eliminate coefficients that are beyond an assigned filter length. The truncated time domain equivalents of the interpolated $H_{valid}$ make up the initial IQ correction function, $h_{corr}$, generated by correction function module 370.

The process of truncation to generate the initial IQ mismatch correction function, $h_{corr}$, may introduce additional errors while correcting IQ mismatch. To reduce the additional IQ mismatch caused by truncation, an aspect of the present invention obtains the error between the estimates of H(f) at the valid bins, $H_{valid}$, and fast fourier transform (FFT) version of the initial IQ mismatch correction function $h_{corr}$, $H_{corr}$, at the valid bins. This error is then used to generate an enhanced IQ mismatch correction function, $g_{corr}$, and update the filter coefficients to be used for IQ mismatch correction. This process can be iterated multiple times. These aspects of the present invention may be implemented using various architectures. FIGS. 4-8 illustrate examples of these various architectures.

Figure 4:
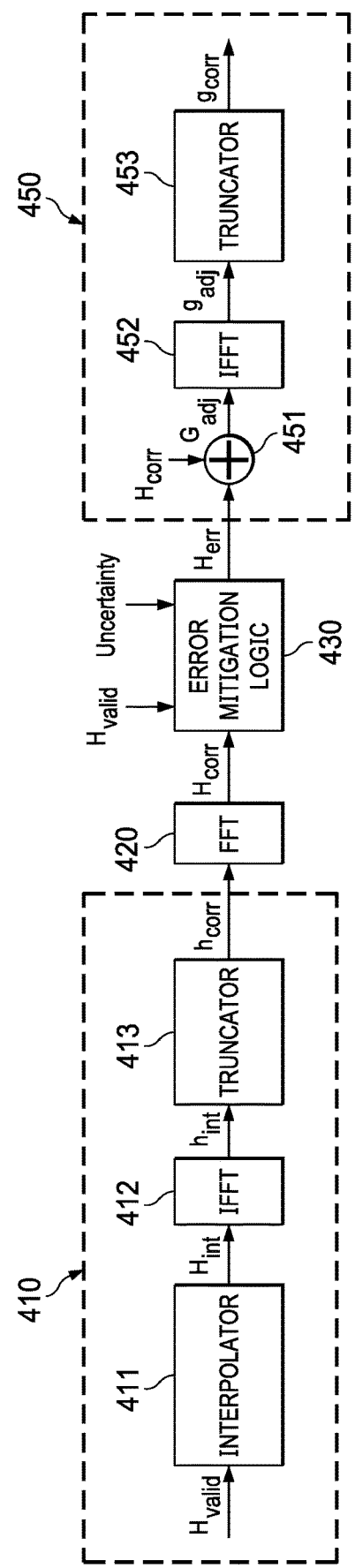
FIG. 4 illustrates a block diagram of a correction function module according to an aspect of the present invention.

FIG. 4 illustrates a block diagram of correction function module 370 of FIG. 3 according to an aspect of the present invention. Correction function module 370 of FIG. 4 comprises initial IQ mismatch correction function generator 410, error mitigation logic 430, and enhanced IQ mismatch correction function generator 450.

Initial IQ mismatch correction function generator 410 is configured to generate an initial IQ mismatch correction function $h_{corr}$ for IQ mismatch correction filter 380 based on the estimates of H(f) at valid bins, $H_{valid}$. As noted above, the initial IQ mismatch correction function $h_{corr}$ generated by initial IQ mismatch correction function generator 410 serves as the initial IQ mismatch correction filter coefficients of IQ mismatch correction filter 380 of FIG. 3. $H_{valid}$ is output from IQ imbalance estimation module 360 of FIG. 3. Valid bins are frequency bins where signals are present. At any point in time, there may be one valid bin, or more than one valid bins. Initial IQ mismatch correction function generator 410 generates the initial IQ mismatch correction function $h_{corr}$ by first interpolating the IQ mismatch estimates $H_{valid}$ by interpolator 411.

Interpolator 411 may employ various interpolation or extrapolation methods to interpolate the IQ mismatch estimates at valid bins, $H_{valid}$. For example, in FIG. 5, which illustrate graphs of the FFT versions of the initial IQ mismatch correction function, $h_{corr}$, and enhanced IQ mismatch correction function, $g_{corr}$, generated according to an aspect of the present invention, interpolator 411 may generate an interpolated IQ mismatch estimates $H_{hint}$ by linearly interpolating $H_{valid}$, as shown in graph (a) of FIG. 5.

Figure 5A:
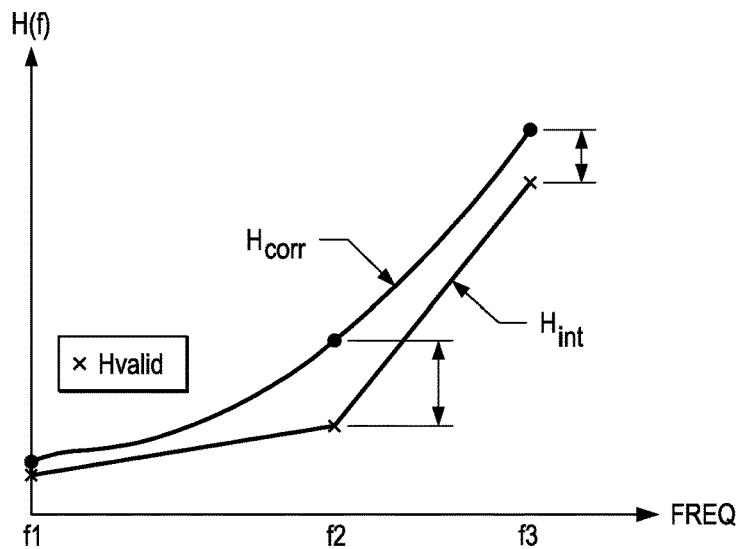
FIGS. 5A-5C illustrate graphs of initial IQ mismatch correction function and enhanced IQ mismatch correction function according to an aspect of the present invention across plurality of frequency bins.
Figure 5B:
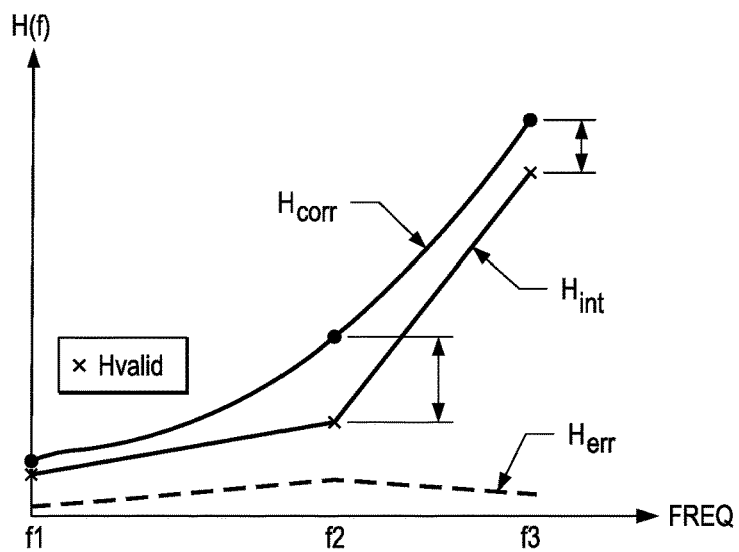
Figure 5C:
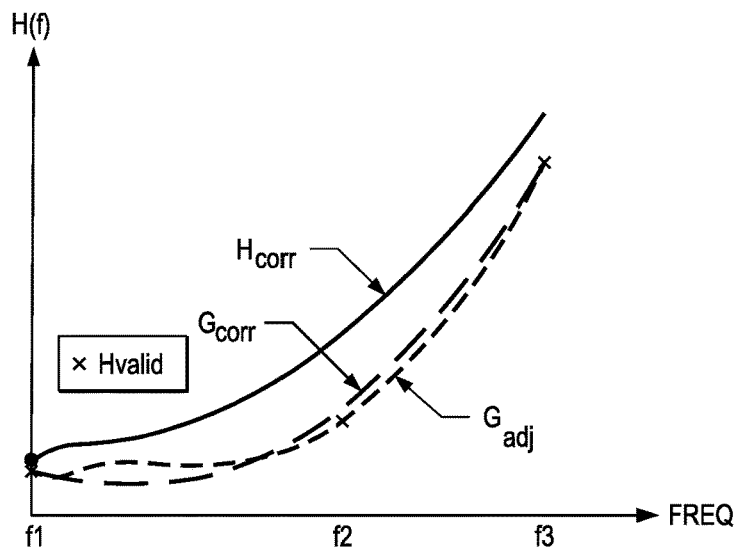

More specifically, graph (a) of FIG. 5 illustrates IQ mismatch estimates at three frequency bins f1, f2, and f3, which are $H_{valid}$ provided by IQ imbalance estimation module 360, and interpolated IQ mismatch estimates $H_{int}$, which are output from interpolator 411. In FIG. 5 graph (a), interpolator 411 linearly interpolates the IQ mismatch estimates $H_{valid}$ to provide interpolated IQ mismatch estimates $H_{int}$ across a range of frequency of interest. In the drawings, the mismatch estimates are shown as real functions for ease of depiction although in reality they may be complex functions.

Interpolated IQ mismatch estimates $H_{int}$ is inverse fast fourier transformed into its time domain equivalents $h_{int}$ by inverse fast fourier transform logic 412, and truncated to reduce the number of taps of IQ mismatch correction filter 380 by truncator 413. Output of truncator 413 is the initial IQ mismatch correction function, $h_{corr}$, generated by initial IQ mismatch correction function generator 410. Fast fourier transform logic 420, which may be employed by and form a part of error mitigation logic 430, computes fast fourier transform of the initial IQ mismatch correction function, $h_{corr}$, to generate a frequency domain equivalent of the initial IQ mismatch correction function $h_{corr}$, $H_{corr}$. According to yet another example, fast fourier transform logic 420 may be employed by and form a part of initial IQ mismatch correction function generator 410.

As observed in graph (a) of FIG. 5, the frequency domain equivalent of the initial IQ mismatch correction function $H_{corr}$ does not follow the paths of either IQ mismatch estimates $H_{valid}$ or interpolated IQ mismatch estimates $H_{int}$. The error, which is indicated on graph (a) by arrows between the frequency domain equivalent of the initial IQ mismatch correction function $H_{corr}$ and IQ mismatch estimates $H_{valid}$, is caused by the truncation function performed by truncator 413 to reduce the number of taps.

Error mitigation logic 430 computes the error between the frequency domain equivalent of the initial IQ mismatch correction function $H_{corr}$ and IQ mismatch estimates at the valid bins, $H_{valid}$, to generate error function $H_{err}$, which is illustrated in graph (b) of FIG. 5. In particular, in the example of FIGS. 4 and 5, error mitigation logic 430 calculates differences of the frequency domain equivalent of the initial IQ mismatch correction function $H_{corr}$ from IQ mismatch estimates $H_{valid}$ at the valid bins, e.g., frequency bins f1, f2, and f3. And based on the differences, error mitigation logic 430 outputs error function $H_{err}$ to enhanced IQ mismatch correction function generator 450.

In the example of FIGS. 4 and 5, error function $H_{err}$ generated by error mitigation logic 430 estimates errors across the entire frequency range of interest, in addition to three errors corresponding to valid frequency bins f1, f2, and f3, by interpolating the three errors as illustrated in graph (b) of FIG. 5. This interpolation may be based on an linear interpolation or any other known interpolation scheme. According to another aspect of the present invention, error function may simply be the errors corresponding to the frequency bins f1, f2, and f3, and 0s elsewhere with optional scaling on the three errors as well. According to yet another aspect of the present invention, error function may be based on a subset of low uncertainty errors as described in relation to FIG. 7.

Enhanced correction function generator 450 generates a frequency domain enhanced IQ mismatch correction function $G_{corr}$ (expressed as $g_{corr}$ in time domain) based on the frequency domain equivalent of the initial IQ mismatch correction function $H_{corr}$ and error function $H_{err}$. In the example of FIG. 4, enhanced IQ correction function generator 450 comprises sum logic 451 configured to add error function $H_{err}$ to the frequency domain equivalent of the initial IQ mismatch correction function $H_{corr}$ to generate an error adjusted initial IQ mismatch correction function $G_{adj}$, inverse fast fourier transform logic 452 configured to inverse fast fourier transform the output of sum logic 451 and generate the time domain equivalent $g_{adj}$ of error adjusted initial IQ mismatch correction function $G_{adj}$, truncator 453 configured to truncate the time domain equivalent of error adjusted initial IQ mismatch correction function, $g_{adj}$, to reduce a number of taps of IQ mismatch correction filter 380 and generate enhanced IQ mismatch correction function $g_{corr}$ in time domain.

Graph (c) of FIG. 5 illustrates IQ mismatch estimates at valid bins, $H_{valid}$, from IQ imbalance estimation module 360, the frequency domain equivalent of the initial IQ mismatch correction function $H_{corr}$ from fast fourier transform logic 420, error adjusted initial IQ mismatch correction function $G_{adj}$ output from sum logic 451, and the frequency domain equivalent of the enhanced IQ mismatch correction function $g_{corr}$ output from truncator 453, $G_{corr}$. As illustrated in graph (c), the difference between frequency domain enhanced IQ mismatch correction function $G_{corr}$ and IQ mismatch estimates $H_{valid}$ is significantly lower than the difference between frequency domain initial IQ mismatch correction function $H_{corr}$ and IQ mismatch estimates $H_{valid}$.

Figure 6:
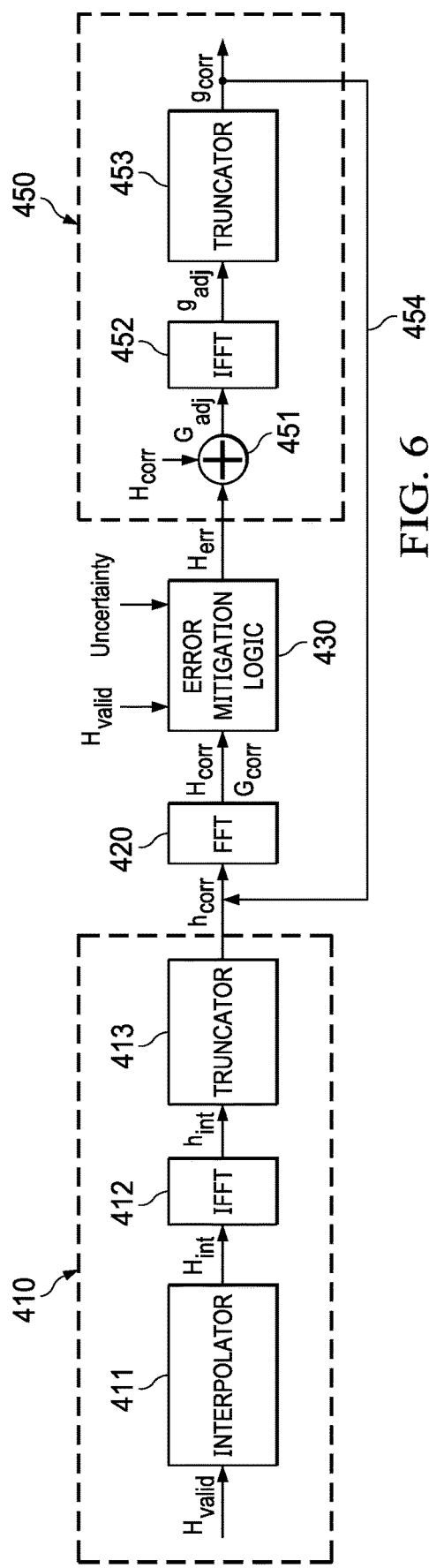
FIG. 6 illustrates a block diagram of a correction function module according to yet another aspect of the present invention.

According to an aspect of the present invention, IQ mismatch correction module may further comprise feedback logic 454 configured to feedback enhanced IQ mismatch correction function $g_{corr}$ to error mitigation logic 430, after the fed back time domain enhanced IQ mismatch correction function $g_{corr}$ is fast fourier transformed into frequency domain by fast fourier transform logic 420. FIG. 6 illustrates an IQ mismatch correction module including feedback logic 454 according to an aspect of the present invention. When $g_{corr}$ is fed back to fast fourier transform logic 420, error mitigation logic 430 is configured to compute error function $H_{err}$ based on $G_{corr}$ instead of $H_{corr}$. Enhanced IQ mismatch correction function generator 450 generates the time domain equivalent $g_{adj}$ error adjusted initial IQ mismatch correction function $G_{adj}$ based on the error function $H_{err}$ from error mitigation logic 430, wherein the error function $H_{err}$ is based on $G_{corr}$.

In other words, in the example of FIG. 6, error mitigation logic 430 is further configured to determine errors of enhanced IQ correction function $G_{corr}$ by comparing the difference of the values of enhanced IQ correction function $G_{corr}$ corresponding to three frequency bins f1, f2, and f3, from the IQ mismatch estimates $H_{valid}$. Enhanced IQ mismatch correction function generator 450 is further configured to generate a subsequent enhanced IQ mismatch correction function based on the fed back enhanced IQ mismatch function $G_{corr}$ and the error of the fed back enhanced mismatch correction function $G_{corr}$ by repeating the process described in relation to FIGS. 4 and 5. The feedback and generation of subsequent enhanced IQ mismatch correction function may continue until the error of the last enhanced IQ mismatch correction function is lower than a threshold value. If all errors based on the fed back enhanced mismatch correction function $G_{corr}$ is below a threshold, there is no need to update the IQ mismatch correction function any further, and the current value of the IQ mismatch correction function may be used as coefficients of IQ mismatch correction filter 380.

Figure 7:
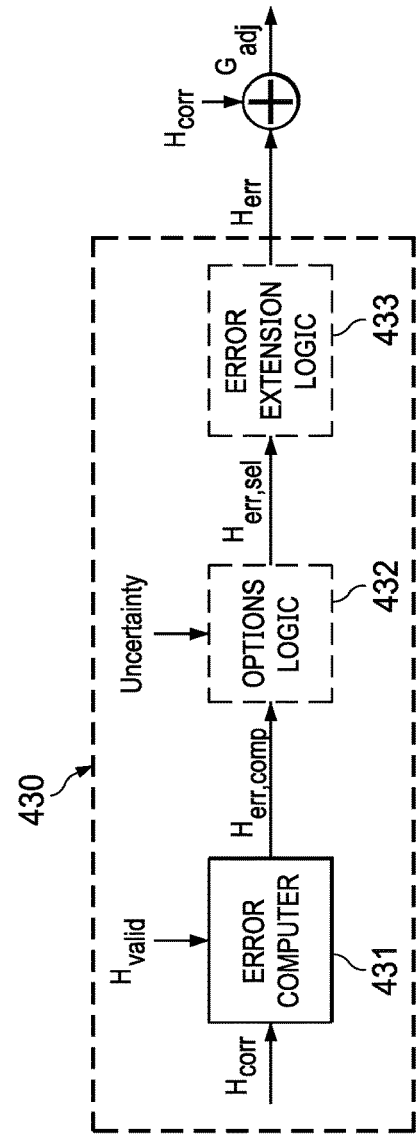
FIG. 7 illustrates a block diagram of an error mitigation logic according to an aspect of the present invention.

FIG. 7 illustrates a block diagram of error mitigation logic 430 of FIG. 4 or 6 according to an aspect of the present invention. Error mitigation logic 430 comprises error computer 431 configured to compute the error of the frequency domain initial IQ mismatch correction function $H_{corr}$ based on the difference between IQ mismatch estimates at valid bins, $H_{valid}$, and the values of the frequency domain initial IQ mismatch correction function $H_{corr}$ (or enhanced IQ mismatch correction function $G_{corr}$ when $G_{corr}$ is fed back by feedback block 454) at a respective bin of the valid bins. The error is shown in FIG. 7 as $H_{err, comp}$. Mathematically, $H_{eer, comp}$ can be expressed as the result of subtracting $H_{corr}$ or $G_{corr}$ from $H_{valid}$ (i.e., $H_{err, comp} = H_{valid} - H_{corr}$ (or $G_{corr}$)).

According to another aspect of the present invention, error mitigation logic 430 may further include options logic 432, which is configured to determine quality metrics, uncertainty, with each error. The uncertainty of the error is computed based on the uncertainty of IQ mismatch estimates at valid bins, $H_{valid}$, which is determined by IQ imbalance estimation module 360 of FIG. 3. In one example, the uncertainty of the error may be the uncertainty of $H_{valid}$ itself.

Options logic 432, in turn, selects a subset of errors whose uncertainty level is less than a threshold times the error value computed by error computer 431, and outputs the selected subset of errors, $H_{err, sel}$. For other bins where uncertainty is larger than a threshold times the error value, $H_{err, sel}$ is made 0 as there is no need to update these bins. This is because, when the error times the threshold is below the uncertainty, there is need to improve the corresponding estimate. Enhanced IQ correction function generator 450 may generate an enhanced IQ mismatch function based on selected errors $H_{err, sel}$, instead of errors calculated by error computer 431, $H_{err, comp}$.

According to an aspect of the present invention, error mitigation logic 430 further include error extension logic 433 configured to interpolate the error values computed by error computer 431 across the entire frequency range of interest and generate error function $H_{err}$. For example, error extension logic 433 may generate error function $H_{err}$ by linearly interpolating the error values computed by error computer 431, $H_{err, comp}$, as illustrated in graph (b) of FIG. 5. In another example, error extension logic 433 generates error function $H_{err}$ based on errors computed at the valid bins, $H_{err, comp}$, and 0s for the remaining frequency bins. Error extension logic 433 may optionally scale the errors computed at the valid bins, $H_{err, comp}$, while generating error function $H_{err}$ by providing 0s for the remaining frequency bins. In an example of error mitigation logic 430 including an options logic 432, error extension logic 433 generates error function $H_{err}$ based on a subset of errors selected by options logic 432, $H_{err, sel}$.

Figure 8:
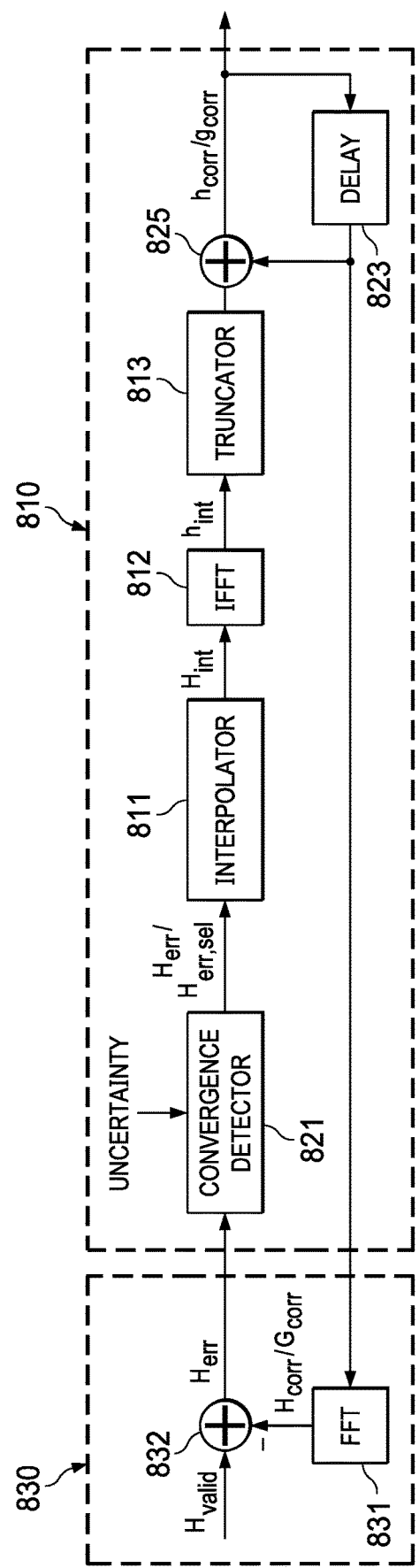
FIG. 8 illustrates a block diagram of a correction function module according to yet another aspect of the present invention.

FIG. 8 illustrates another example of correction function module 370 according to yet another aspect of the present invention. In the example of FIG. 8, correction function module 370 comprises IQ mismatch correction function generator 810 configured to generate an initial IQ mismatch correction function, $h_{corr}$, and enhanced IQ mismatch correction function, $g_{corr}$, based on IQ mismatch estimates at valid bins, $H_{valid}$, and feedback loop 830 configured to feedback either the initial IQ mismatch correction function, $h_{corr}$, or the enhanced IQ mismatch correction function, $g_{corr}$, to the IQ mismatch correction function generator 810. The IQ mismatch correction function generator 810 is further configured to determine the error of the fed back initial IQ mismatch correction function, $h_{corr}$, or enhanced IQ mismatch correction function, $g_{corr}$, and generate a subsequent IQ mismatch correction function based on the error.

In FIG. 8, the initial IQ mismatch correction function, $h_{corr}$, is an IQ mismatch correction function output from IQ mismatch correction function generator 810 based on IQ mismatch estimates at valid bins, $H_{valid}$. The enhanced IQ mismatch correction function, $g_{coor}$, is a IQ mismatch correction function output from IQ mismatch correction function generator 810, subsequent to the initial IQ mismatch correction function, $h_{corr}$. The enhanced IQ mismatch correction function, $g_{corr}$, is generated based on the fed back initial IQ mismatch correction function, $h_{corr}$, and IQ mismatch estimates at valid bins, $H_{valid}$. Depending on the error levels of the enhanced IQ mismatch correction function, $g_{corr}$, a subsequent version of the enhanced IQ mismatch correction function may be generated based on the fed back enhanced IQ mismatch correction function, $g_{corr}$, and IQ mismatch estimates at valid bins, $H_{valid}$.

The initial IQ mismatch correction function, $h_{corr}$, is generated by IQ mismatch correction function generator 810 according to the following. First, interpolator 811 interpolates IQ estimates at valid bins, $H_{valid}$, based on an interpolation or extrapolation method. In one example, interpolator 811 may interpolate IQ estimates at valid bins, $H_{valid}$, pursuant to the interpolation method adopted by interpolator 411 of FIG. 4. The output of interpolator 811, interpolated IQ mismatch estimates $H_{int}$, is inverse fast fourier transformed by inverse fast fourier transform logic 812, and truncated to reduce the number of taps of IQ mismatch correction filter 380 by truncator 813. The output of truncator 813 based on IQ estimates at valid bins, $H_{valid}$, is the initial IQ mismatch correction function, $h_{corr}$. The functions of inverse fast fourier transform logic 812 and truncator 813 are substantially similar to the functions of inverse fast fourier transform logic 412 and truncator 413 of FIG. 4, respectively.

The initial IQ mismatch correction function, $h_{corr}$, is fed back to IQ mismatch correction function 810 via feedback loop 830. In FIG. 8, feedback loop 830 comprises fast fourier transform logic 831 configured to fast fourier transform the initial correction function, $h_{corr}$, to frequency domain, $H_{corr}$, and sum logic 832 configured to subtract the frequency domain initial IQ mismatch correction function $H_{corr}$ from the IQ estimates at valid bins, $H_{valid}$. The output of sum logic 832, $H_{err}$, comprises error of the initial IQ mismatch correction function, $h_{corr}$.

IQ mismatch correction function generator 810 comprises convergence detector 821 configured to determine whether the error of the initial IQ mismatch correction function, $h_{corr}$, is within an acceptable range by determining whether the initial IQ mismatch correction function, $h_{corr}$, is converged to be within an acceptable range of error from IQ estimates at valid bins, $H_{valid}$. Where convergence detector 821 determines that the initial IQ mismatch correction function is within the acceptable range of error based on the output of sum logic 832, $H_{err}$, the initial IQ mismatch correction function, $h_{corr}$, is provided as filter coefficients to IQ mismatch correction filter 380 of FIG. 3.

Conversely, where convergence detector 821 determines that the initial IQ mismatch correction function is not within the acceptable range of error, IQ mismatch correction function generator 810 generates the enhanced IQ mismatch correction function, $g_{corr}$, according to the following. First, interpolator 811 interpolates the output of sum logic 832, $H_{err}$, based on an interpolation or extrapolation method. The output of sum logic 832, $H_{err}$, is the error of the initial IQ mismatch correction function, $h_{corr}$, at valid bins. Interpolator 811 interpolates the output of sum logic 832, $H_{err}$, across the frequencies relevant to a receiver. In one example, interpolator 811 may interpolate $H_{err}$ by linearly interpolating the error in IQ estimates at valid bins. In another example, the output of interpolator 811 may simply be the errors corresponding to the valid bins and 0s elsewhere with optional scaling on the valid bin errors.

Convergence detector 821, according to yet another example of the present invention, may select errors from which the enhanced IQ mismatch correction function, $g_{corr}$, shall be generated. For example, convergence detector 821 may be further configured to determine quality metrics, uncertainty, with each error corresponding to the valid bins. The uncertainty of the error is computed based on the uncertainty of IQ mismatch estimates at the valid bins, $H_{valid}$. In one example, the uncertainty of the error may be the uncertainty of $H_{valid}$ itself Convergence detector 821 selects a subset of errors whose uncertainty level is less than a threshold times each values of $H_{err}$, and outputs the selected subset of errors, as $H_{err, sel}$, to interpolator 811. For bins where uncertainty is larger than a threshold times the corresponding error value, the error value is replaced with 0 as there is no need to update these bins. Interpolator 811, in turn, interpolates $H_{err, sel}$, to generate error across the relevant frequencies, then output as Hint Inverse fast fourier transform logic 812 inverse fast fourier transforms the interpolated $H_{int}$, and truncator 813 truncates the inverse fast fourier transformed $H_{int}$ according to the filter length size of IQ mismatch correction filter 380. The initial IQ mismatch correction function, $h_{corr}$, is time delayed via delay logic 823 and output to sum logic 825. Sum logic 825 generates the enhanced IQ mismatch correction function, $g_{corr}$, based on the output of truncator 813 and the time delayed initial IQ mismatch correction function, $h_{corr}$. In one example, the initial IQ mismatch correction function, $h_{corr}$, is time delayed to be provided to sum logic 825 when truncator 813 outputs the time domain, interpolated and truncated error. In the example of FIG. 8, sum logic 825 generates the enhanced IQ mismatch correction function, $g_{corr}$, by adding the time delayed initial IQ mismatch correction function, $h_{corr}$, with the time domain, interpolated and truncated error.

Correction function module 370 may further generate a subsequent enhanced IQ mismatch correction function after the enhanced IQ mismatch correction function, $g_{corr}$, is fed back via feedback loop 830. Sum logic 832 determines the error of enhanced IQ mismatch correction function, $g_{corr}$, by subtracting the values of the enhanced IQ mismatch correction function, $g_{corr}$, from the IQ estimates at valid bins, $H_{valid}$. Convergence detector 821 compares the error, $H_{err}$, output from sum logic 832 of valid bins with a threshold multiplied by the uncertainty of the corresponding IQ estimate at each valid bins, or merely compares the error with a threshold. The comparison may be based on the absolute value of the error.

Where the error is less than the compared value, there is no need to generate any subsequent iterations of IQ mismatch correction functions for that bin. This implies that that valid bin's estimate has been converged. In this case, the $H_{err}$ is made 0 for that the respective bin. $H_{err}$ for other bins, of which the error is not less than the multiple threshold value or other compared value, retains the error value output from sum logic 853. IQ mismatch correction function generator 810 generates a subsequent version of the enhanced IQ mismatch correction function based on the $H_{err}$ calculated from the enhanced IQ mismatch correction function, $g_{coor}$.

The process of generating subsequent versions of enhanced IQ mismatch correction function is repeated until the errors corresponding to all valid bins is less than the multipled threshold value. In another embodiment, the process is repeated a number of times or for a period of time.

Figure 9:
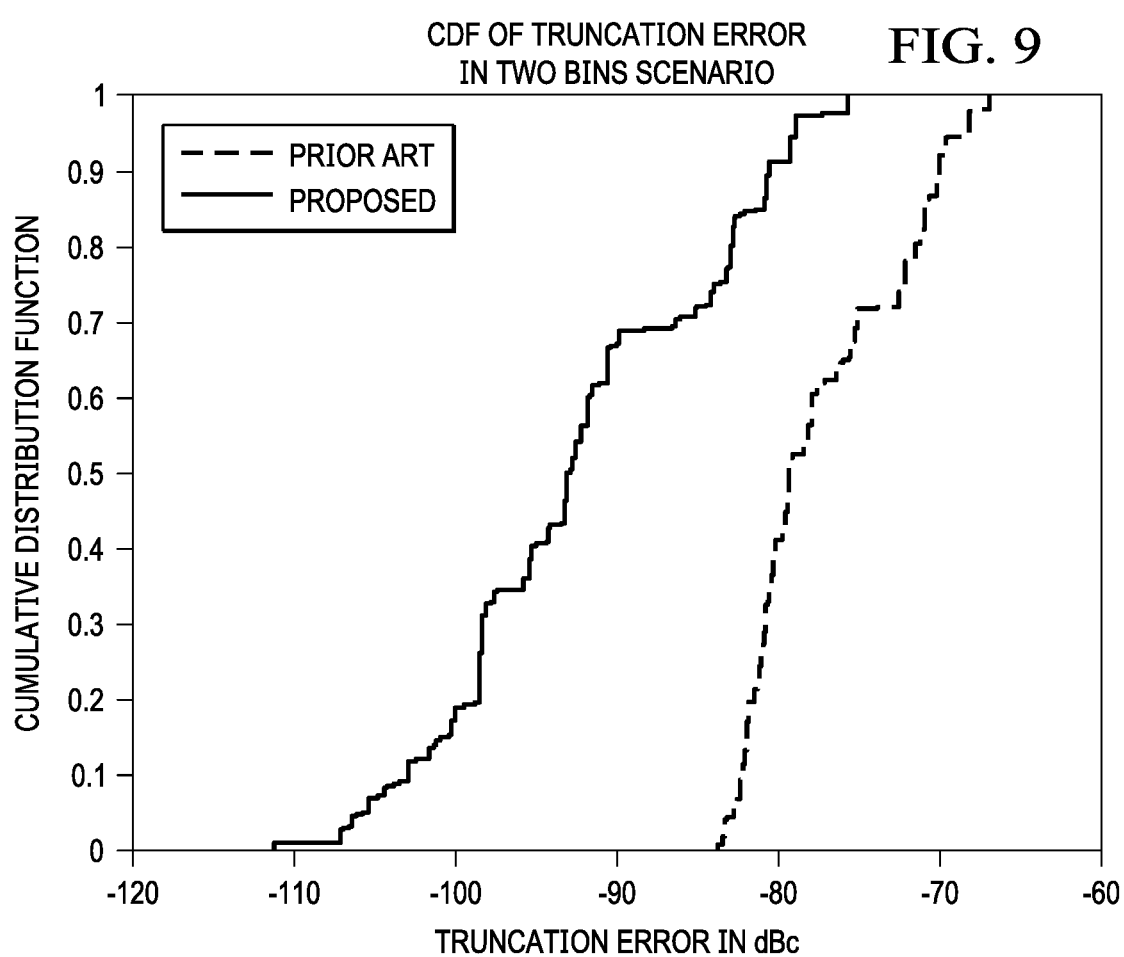
FIG. 9 illustrates the cumulative distribution functions of errors existing in IQ mismatch correction function generated according to an aspect of the present invention.

FIG. 9 illustrates the cumulative distribution functions of errors existing in IQ mismatch correction function generated according to an aspect of the present invention. In FIG. 9, estimates are obtained for two adjacent bins, where bin selection is a randomized across runs. As illustrated, an output based on an example of the present invention improves its performance significantly, which delivers over 10 dB of improvement.

The above description and drawings are only to be considered illustrative of an example of the present invention which achieves the features and advantages described herein. Modifications are possible in the described examples, and other examples are possible, within the scope of the claims. Accordingly, the examples of the present invention described herein is not considered as being limited by the foregoing description and drawings.

What is claimed is:

1. An in-phase and quadrature-phase (IQ) signal receiver comprising;
    an IQ imbalance estimation circuit configured to estimate IQ mismatch corresponding to at least one frequency bin based on a signal received by the IQ signal receiver;
    a correction function circuit coupled to the IQ imbalance estimation circuit and generate at least one IQ mismatch correction function based on the IQ mismatch estimates of the IQ imbalance estimation circuit; and
    an IQ mismatch correction function circuit coupled to the correction function circuit and compensate the signal received by the IQ signal receiver for IQ mismatch based on the IQ mismatch correction function generated by the correction function circuit;
    wherein, the at least one IQ mismatch correction function circuit comprises an initial IQ mismatch correction function generated based on the IQ mismatch estimates generated by the IQ imbalance estimation circuit, and an enhanced IQ mismatch correction function generated based on a difference between a value of the initial IQ mismatch correction function corresponding to the at least one frequency bin and the IQ mismatch estimates corresponding to a respective bin of the at least one frequency bin.

2. The IQ signal receiver of claim 1,
    wherein the at least one frequency bin corresponds to the frequency of the signal received by the IQ signal receiver.

3. The IQ signal receiver of claim 1, wherein the IQ mismatch correction function circuit comprising;
    an initial IQ mismatch correction function generator configured to generate the initial IQ mismatch correction function;
    an error mitigation circuit configured to determine an error of the initial IQ mismatch correction function based on the difference between the value of the initial IQ mismatch correction function corresponding to the at least one frequency bin and the IQ mismatch estimates corresponding to the respective bin of the at least one frequency bin; and
    an enhanced IQ mismatch correction function generator configured to generate the enhanced IQ mismatch correction function based on the initial IQ mismatch function and the error of the initial IQ mismatch correction function.

4. The IQ signal receiver of claim 3,
    wherein the initial IQ mismatch correction function generator comprises, an interpolator configured to interpolate the IQ mismatch estimates generated by the IQ imbalance estimation circuit;

an inverse fast fourier transform circuit configured to inverse fast fourier transform the interpolated IQ mismatch estimates generated by the interpolator; and a truncator configured to truncate the interpolated and inverse fast fourier transformed IQ mismatch and generate the initial IQ mismatch correction function.

5. The IQ signal receiver of claim 4, wherein the IQ mismatch correction function circuit further comprises a fast fourier transform circuit configured to fast fourier transform an output from the truncator to generate a frequency domain initial IQ mismatch correction function, and wherein the error of the initial IQ mismatch correction function is determined based on an output of the fast fourier transform circuit.

6. The IQ signal receiver of claim 3, wherein the error mitigation circuit comprises, an error circuit configured to compute the error of the initial IQ mismatch correction function; and an error extension circuit configured to generate an error function corresponding to a plurality of frequency bins based on the error of the initial IQ mismatch correction function, wherein the plurality of frequency bins comprises frequency bins of the IQ signal receiver.

7. The IQ signal receiver of claim 6, wherein the error extension circuit is configured to generate the error function by linearly interpolating the error of the initial IQ mismatch correction function across the plurality of frequency bins.

8. The IQ signal receiver of claim 6, wherein the error mitigation circuit further comprises, an options circuit configured to select a subset of the error computed by the error circuit based on a threshold value; and wherein the error extension circuit is configured to generate the error function based on the subset of error selected by the options circuit.

9. The IQ signal receiver of claim 8, wherein the IQ mismatch estimate of the at least one frequency bin comprises a first IQ mismatch estimate of a first frequency bin and a second IQ mismatch estimate of a second frequency bin;

wherein the error of the initial IQ correction function computed by the error circuit comprises a first error corresponding to the first frequency bin and a second error corresponding to second frequency bin; and wherein the options circuit is further configured to select the subset by selecting either or both of the first and second errors by determining whether the first and second errors are above the threshold value multiplied by a quality metric of the first IQ mismatch estimate and the second IQ mismatch estimate, respectively.

10. The IQ signal receiver of claim 3, wherein the enhanced IQ mismatch correction function generator comprises, a sum circuit configured to add the error of the initial IQ mismatch correction function determined by the error mitigation circuit to the initial IQ mismatch correction function to output an error adjusted initial IQ mismatch correction function;

an inverse fast fourier transform circuit configured to inverse fast fourier transform the output of the sum circuit into time domain; and a truncator configured to truncate the time domain output of the sum circuit to reduce a number of taps of the IQ mismatch correction function circuit and generate the enhanced IQ mismatch correction function.

11. The IQ signal receiver of claim 3 further comprises, a feedback circuit configured to feed back the enhanced IQ mismatch correction function to the error mitigation circuit, wherein the error mitigation circuit is configured to determine an error of the enhanced IQ mismatch correction function based on a difference between a value of the enhanced IQ mismatch correction function corresponding to the at least one frequency bin and the IQ mismatch estimate corresponding to the respective bin of the at least one frequency bin; and the enhanced IQ mismatch correction function generator is further configured to generate a subsequent enhanced IQ mismatch correction function based on the fed back enhanced IQ mismatch correction function and the error of the fed back enhanced IQ mismatch correction function.

12. The IQ signal receiver of claim 1, wherein the correction function circuit comprising, an IQ mismatch correction function generator configured to generate the initial IQ mismatch correction function and the enhanced IQ mismatch correction function; and a feedback loop configured to determine the difference between the value of the initial IQ mismatch correction function corresponding to the at least one frequency bin and the IQ mismatch estimates corresponding to a respective bin of the at least one frequency bin, and output the difference as error of the initial IQ mismatch correction function to the IQ mismatch correction function generator to generate the enhanced IQ mismatch correction function.

13. The IQ signal receiver of claim 12, wherein the IQ mismatch correction function generator comprising, an interpolator configured to interpolate the IQ mismatch estimates generated by the IQ imbalance estimation function circuit;

an inverse fast fourier transform circuit configured to inverse fast fourier transform the interpolated IQ mismatch estimates generated by the interpolator; and a truncator configured to truncate the inverse fast fourier transformed interpolated IQ mismatch estimates and generate the initial IQ mismatch correction function.

14. The IQ signal receiver of claim 13, wherein the IQ mismatch correction function generator further comprising, a convergence detector coupled to the interpolator; a sum circuit coupled to the truncator; and a delay circuit coupled to the sum circuit, wherein the convergence detector is configured to determine whether values of the initial IQ mismatch correction function corresponding to the at least one frequency bin has converged with the IQ mismatch estimates corresponding to the respective bin of the at least one frequency bin generated by the IQ imbalance estimation function circuit based on the error output from the feedback loop, and output at least a subset of the error;

wherein the interpolator is configured to interpolate the at least subset of the error output from the convergence detector;

wherein the inverse fast fourier transform circuit is configured to inverse fast fourier transform the interpolated at least subset of the error output from the interpolator;

wherein the truncator is configured to truncate the inversed fast fourier transformed interpolated at least subset of the error to reduce a number of taps of the IQ mismatch correction function circuit;

wherein the delay circuit is configured to delay output of the initial IQ mismatch correction function to the sum circuit; and wherein the sum circuit is configured to generate the enhanced IQ mismatch correction function by adding the delayed initial IQ mismatch correction function to an output from the truncator.

15. The IQ signal receiver of claim 14, wherein the feedback loop is further configured to feedback the enhanced IQ mismatch correction function, determine errors of the enhanced IQ mismatch correction function based on a difference between values of the enhanced IQ mismatch correction function corresponding to the at least one frequency bin and the IQ mismatch estimates corresponding to the respective bin of the at least one frequency bins, and output the errors of the enhanced IQ mismatch correction function to the IQ mismatch correction function generator; and the IQ mismatch correction function generator is further configured to generate a subsequent version of the enhanced IQ mismatch correction function based on the error of the enhanced IQ mismatch correction function output by the feedback loop.

16. The IQ signal receiver of claim 15, wherein the convergence detector is further configured to determine whether values of the enhance IQ mismatch correction function corresponding to the at least one frequency bin has converged with the IQ mismatch estimates corresponding to a the respective bin of the at least one frequency bin generated by the IQ imbalance estimation circuit, based on the error of the enhanced IQ mismatch correction function output from the feedback loop; and wherein the IQ mismatch correction function generator is configured to repeat generating the subsequent version of the enhanced IQ mismatch correction function until the convergence detector determines the feedback enhanced IQ mismatch correction function is converged or until subsequent versions of the enhanced IQ mismatch correction function are generated a preset number of times, or for a preset period of time.

17. The IQ signal receiver of claim 14, wherein the subset of the error is zero where the values of all initial IQ mismatch correction functions corresponding to all of the at least one frequency bin converged.

\* \* \* \* \*